United States Patent
Saberian et al.

(10) Patent No.: US 9,852,492 B2
(45) Date of Patent: Dec. 26, 2017

(54) FACE DETECTION

(71) Applicant: Yahoo Holdings, Inc., Sunnyvale, CA (US)

(72) Inventors: Mohammad Saberian, Sunnyvale, CA (US); Sachin Sudhakar Farfade, Santa Clara, CA (US); Jia Li, Santa Clara, CA (US)

(73) Assignee: Yahoo Holdings, Inc., Sunnyvale, CA (US)

( * ) Notice: Subject to any disclaimer, the term of this patent is extended or adjusted under 35 U.S.C. 154(b) by 0 days.

(21) Appl. No.: 14/859,040

(22) Filed: Sep. 18, 2015

(65) Prior Publication Data

US 2017/0083752 A1    Mar. 23, 2017

(51) Int. Cl.
| | | |
|---|---|---|
| *G06K 9/00* | (2006.01) | |
| *G06T 3/40* | (2006.01) | |
| *G06K 9/62* | (2006.01) | |
| *G06K 9/46* | (2006.01) | |

(52) U.S. Cl.
CPC ............ *G06T 3/40* (2013.01); *G06K 9/00248* (2013.01); *G06K 9/4628* (2013.01); *G06K 9/6272* (2013.01)

(58) Field of Classification Search
CPC ............. G06K 9/00288; G06K 9/6256; G06K 2009/4666; G06K 9/66; G06K 9/46; G06T 3/40; G06T 7/0042; G06T 2207/20024
USPC .......................................... 382/156–159, 118
See application file for complete search history.

(56) References Cited

U.S. PATENT DOCUMENTS

| | | | | |
|---|---|---|---|---|
| 2015/0278642 | A1* | 10/2015 | Chertok | G06N 3/02 |
| | | | | 382/156 |
| 2016/0140436 | A1* | 5/2016 | Yin | G06N 3/08 |
| | | | | 706/20 |
| 2016/0148080 | A1* | 5/2016 | Yoo | G06K 9/4628 |
| | | | | 382/157 |

OTHER PUBLICATIONS

Li, et al. (A Convolutional Neural Network Cascade for Face Detection), IEEE, pp. 5325-5334, 2012.*
Delakis, et al. (Training Convolutional Filters for Robust Face Detection), IEEE, pp. 739-748, 2003.*
Krizhevsky, et al. (Image Net Classification with Deep Convolutional Neural Networks), University of Toronto, pp. 1-9, 2012.*
Farfade, et al, Multi-view Faec Detection Using Deep Convolutional Neaural Networks, ICMR '15, Jun. 23-26, 2015, Shanghai China, 8 Pages.

* cited by examiner

*Primary Examiner* — Daniel Mariam
(74) *Attorney, Agent, or Firm* — Berkeley Law & Technology Group, LLP

(57) ABSTRACT

Briefly, embodiments of methods and/or systems of detecting and image of a human face in a digital image are disclosed. For one embodiment, as an example, parameters of a neural network may be developed to generate object labels for digital images. The developed parameters may be refined by a neural network to generate signal sample value levels corresponding to probability that a human face may be depicted at a localized region of a digital image.

20 Claims, 4 Drawing Sheets

400

500

FACE DETECTION

BACKGROUND

1. Field

The present disclosure relates generally to detection of certain objects, such as one or more human faces oriented at one or more aspects, for example, which may be depicted in at least a portion of a captured image.

2. Information

On occasion, such as in connection with accessing a video image stream and/or performing image processing on a database comprising a number of still images, for example, it may be desirable to determine an identity of one or more persons depicted in an image. In some instances, determination of the identity one or more persons depicted in an image frame may be made possible by utilizing a facial recognition tool, which may provide one or more output signal sample values corresponding to names and/or other unique identifiers of persons whose faces may be depicted in a captured digital image, for example. However, such tools may not perform as needed in situations other than those involving a full frontal facial image. Thus, techniques to improve image processing for facial recognition continue to be investigated.

BRIEF DESCRIPTION OF DRAWINGS

Claimed subject matter is particularly pointed and/or distinctly claimed in the concluding portion of the specification. However, both as to organization and/or method of operation, together with objects, claimed features, and/or advantages thereof, claimed subject matter may be understood by reference to the following detailed description if read with the accompanying drawings in which:

Figure 1:
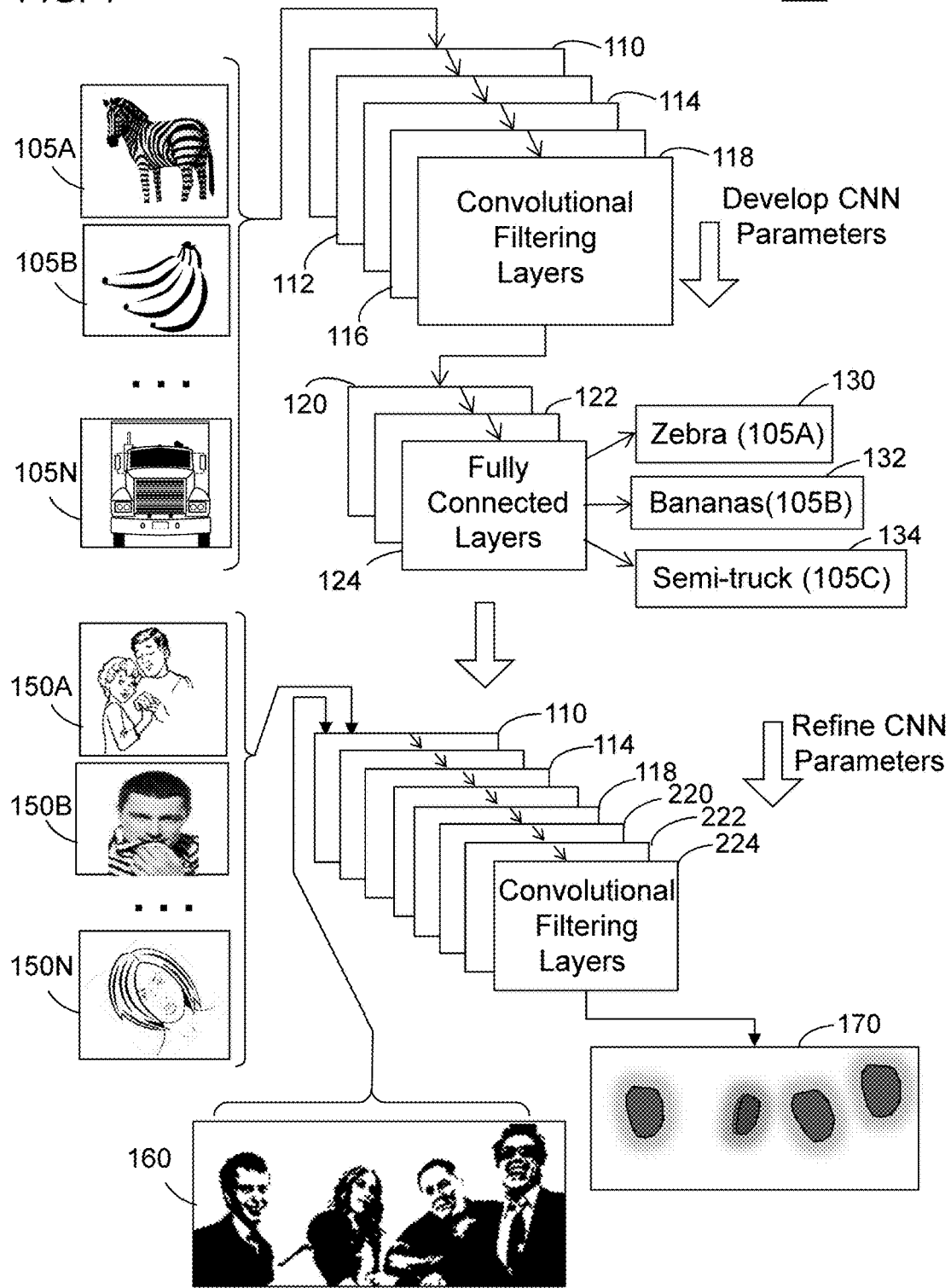
FIG. 1 is a schematic diagram of a neural network, which may operate according to an embodiment.

Reference is made in the following detailed description of the accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples, for example, may be allocated among computing devices, including one or more clients and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

An example of a distributed computing system is the Hadoop distributed computing system, which employs a map-reduce type of architecture. In this context, the terms map-reduce architecture and/or similar terms are intended to refer a distributed computing system implementation for processing and/or for generating large sets of signal samples employing a parallel, distributed process performed over a network of individual computing devices. A map operation and/or similar terms refer to processing of signals to generate one or more key-value pairs and to distribute the one or more pairs to the computing devices of the network. A reduce operation and/or similar terms refer to processing of signals via a summary operation (e.g., such as counting the number of students in a queue, yielding name frequencies). A system may employ such an architecture for processing by marshalling distributed servers, running various tasks in parallel, and managing communications and signal transfers between various parts of a neural network, in an embodiment. (See, for example Jeffrey Dean et al. "Large Scale Distributed Deep Networks," Advances in Neural Information Processing Systems 25, 2012, pp 1232-1240.) As mentioned, one non-limiting, but well-known example, is the Hadoop distributed computing system, which refers to an open source implementation of a map-reduce type architecture, but may include other aspects, such as the Hadoop distributed file system (HDFS). In general, therefore, Hadoop and/or similar terms refer to an implementation scheduler for executing large processing jobs using a map-reduce architecture.

It should be understood that for ease of description, a "network device" (also referred to as a networking device) may be embodied and/or described in terms of a computing device. However, it should further be understood that this description should in no way be construed to imply or suggest that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to additionally imply that two or more components are not necessarily in direct contact, but nonetheless are able to co-operate and/or interact. The term "coupled" is also understood generically to mean indirectly connected, for example, in an appropriate context.

The terms, "and," "or," "and/or," and/or similar terms, as used herein, include a variety of meanings that also are expected to depend at least in part upon the particular context in which such terms are used. Typically, "or" if used to associate a list, such as A, B, or C, is intended to mean A, B, and C, here used in the inclusive sense, as well as A, B, or C, here used in the exclusive sense. In addition, the term "one or more" and/or similar terms is used to describe any feature, structure, and/or characteristic in the singular and/or may also be used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be compliant and/or compatible with differing protocols, such as computing and/or communication protocols (e.g., network protocols), may interoperate within a larger network. In this context, the term "sub-network" and/or similar terms, if used, for example, with respect to a network, refers to the network and/or a part thereof. Sub-networks may also comprise links, such as physical links, connecting and/or coupling nodes so as to be capable to transmit signal packets and/or frames between devices of particular nodes including wired links, wireless links, or combinations thereof. Various types of devices, such as network devices and/or computing devices, may be made available so that device interoperability is enabled and/or, in at least some instances, may be transparent to the devices.

In this context, the term "transparent" refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices capable of communicating with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but such devices outside the private network may not necessarily be able to direct inbound network communications to devices included in the private network.

The Internet refers to a decentralized global network of interoperable networks that comply with the Internet Protocol (IP). It is noted that there are several versions of the Internet Protocol. Here, the term "Internet Protocol," "IP," and/or similar terms, is intended to refer to any version, now known and/or later developed of the Internet Protocol. The Internet includes local area networks (LANs), wide area networks (WANs), wireless networks, and/or long haul public networks that, for example, may allow signal packets and/or frames to be communicated between LANs. The term "World Wide Web" ("WWW" or "Web") and/or similar terms may also be used, although these refer to a part of the Internet that complies with the Hypertext Transfer Protocol (HTTP). For example, network devices may engage in an HTTP session through an exchange of appropriately compatible and/or compliant signal packets and/or frames. It is noted that there are several versions of the Hypertext Transfer Protocol. Here, the term "Hypertext Transfer Protocol," "HTTP," and/or similar terms is intended to refer to any version, now known and/or later developed. It is likewise noted that in various places in this document, substitution of the term "Internet" with the term "World Wide Web"

('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may, without limitation, provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility that may be accessible to hundreds of millions of people or more worldwide. Also, in an embodiment, and as mentioned above, the terms "WWW" and/or "Web" refer to a part of the Internet that complies with the Hypertext Transfer Protocol. The Internet and/or the Web, therefore, in this context, may comprise an service that organizes stored content, such as, for example, text, images, video, etc., through the use of hypermedia, for example. A HyperText Markup Language ("HTML"), for example, may be utilized to specify content and/or to specify a format for hypermedia type content, such as in the form of a file and/or an "electronic document," such as a Web page, digital image, a contiguous portion of the digital image, just to name a few examples. An Extensible Markup Language ("XML") may also be utilized to specify content and/or format of hypermedia type content, such as in the form of a file or an "electronic document," such as a Web page, in an embodiment. Of course, HTML and/or XML are merely example languages provided as illustrations. Furthermore, HTML and/or XML (and/or similar terms) is intended to refer to any version, now known and/or later developed of these languages. Likewise, claimed subject matter is not intended to be limited to examples provided as illustrations, of course.

As used herein, the term "Web site" and/or similar terms refer to a collection of related Web pages. Also as used herein, "Web page" and/or similar terms, refer to any electronic file and/or electronic document, such as an electronic digital image, and/or a contiguous portion of an electronic digital image, such as may be accessible via a network, including by specifying a URL for accessibility via the Web, for example. As alluded to above, in one or more embodiments, a Web page may comprise content coded using one or more languages, such as, for example, markup languages, including HTML and/or XML, although claimed subject matter is not limited in scope in this respect. Also, in one or more embodiments, application developers may write code in the form of JavaScript, for example, to provide content to populate one or more templates, such as for an application. The term 'JavaScript' and/or similar terms are intended to refer to any now known and/or later developed version of this programming language. However, JavaScript is merely an example programming language. As was mentioned, claimed subject matter is not intended to be limited to examples and/or illustrations.

As used herein, the terms "detection," "heat map," "likelihood," "probability," "document," "electronic document," "content," "digital image," and/or similar terms are meant to refer to signals and/or states in a physical format, such as a digital signal and/or digital state format, e.g., that may be perceived by a user if displayed, played and/or otherwise executed by a device, such as a digital device, including, for example, a computing device, but otherwise might not necessarily be perceivable by humans (e.g., in a digital format). Likewise, in this context, content (e.g., digital content) provided to a user in a form so that the user is able to perceive the underlying content itself (e.g., hear audio or see images, as examples) is referred to, with respect to the user, as "consuming" content, "consumption" of content, "consumable" content, and/or similar terms. For one or more embodiments, an electronic document may comprise a Web page coded in a markup language, such as, for example, HTML (hypertext markup language).

In another embodiment, an electronic document may comprise a portion or a region of a Web page and/or a portion of a digital image captured using a digital camera. However, claimed subject matter is not intended to be limited in these respects. It should also be noted that, for one or more embodiments, an electronic document and/or digital image may comprise a number of components. Components in one or more embodiments may comprise text, for example, in the form of physical signals and/or physical states (e.g., capable of being physically displayed). Also, for one or more embodiments, components may comprise a graphical object, such as, for example, an image, such as a digital image, and/or a contiguous portion of digital image, which, again, comprises physical signals and/or physical states (e.g., capable of being physically displayed). In an embodiment, content may comprise, for example, text, images, audio, video, and/or other types of electronic documents and/or portions thereof, for example.

Also as used herein, one or more parameters may be descriptive of a collection of signal samples, and may exist in the form of physical signals and/or physical states, such as memory states. For example, one or more parameters, such as parameters of a neural network, may comprise signal sample values utilized in a convolutional filters, signal sample values utilized in one or more kernel masks, response normalization of output signal samples of one or more neurons of a neural network, neuron weighting value levels, size of filters, number of filters, and so forth. Claimed subject matter is intended to embrace meaningful, descriptive parameters in any format, so long as the one or more parameters comprise physical signals.

Signal packets and/or frames, also referred to as signal packet transmissions and/or signal frame transmissions, may be communicated between nodes of a network, and/or among neurons of a neural network, where a node may comprise one or more network devices and/or one or more computing devices, for example. As an illustrative example, but without limitation, a node may comprise one or more sites employing a local network address. Likewise, a device, such as a network device and/or a computing device, may be associated with a computing node. A signal packet and/or frame may, for example, be communicated via a communication channel and/or a communication path, such as comprising a portion of the Internet and/or the Web, from a site via an access node coupled to the Internet. Likewise, a signal packet and/or frame may be forwarded via network nodes to a target site coupled to a local network, for example. A signal packet and/or signal frame communicated via the Internet and/or the Web, for example, may be routed via a path comprising one or more gateways, servers, and so forth, that may, for example, route a signal packet and/or signal frame in accordance with a target and/or destination address and availability of a network path of network nodes to the target and/or destination address. Although the Internet and/or the Web comprises a network of interoperable networks, not all of those interoperable networks are necessarily available and/or accessible to the public. A computing network may be very large, such as comprising thousands of nodes, millions of nodes, billions of nodes, or more, as examples.

Media networks, such as the Yahoo!™ network, for example, may be increasingly seeking ways to attract users to their networks and/or to retain users within their networks for extended periods of time. A media network may, for example, comprise an Internet Web site and/or group of Web sites having one or more sections. For instance, the Yahoo!™ network includes Web sites located within different categorized sections, such as sports, finance, current events, and games, to name just a few non-limiting examples among a variety of possible examples. To attract and/or retain users within its network, Yahoo!™ and/or other media networks may continually strive to provide content relating to categorized sections that may be interesting and/or of use to users.

As more users remain within a media network for extended periods of time, a media network may become more valuable to potential advertisers. Thus, typically, advertisers may be inclined to pay more money and/or provide other considerations to a media network in return for advertising to users, for example, via that media network, its partners, and/or subsidiaries. In an implementation, a user may beneficially interact with a media network to determine whether a face, such as a human face oriented at one of a number of possible aspects, is depicted in a captured digital image. Detection of a multi-aspect human face, for example, in a digital image may make possible facial recognition, in which specialized processing approaches may otherwise be utilized to determine an identity of a person, for example, depicted in one or more localized regions of a digital image. In a few example embodiments, identification of one or more individuals depicted in a digital image may be useful, for example, in law enforcement, electronic surveillance, reconnaissance, or any other type of endeavor in which detection and/or recognition of individuals within a digital image may be worthwhile.

In other implementations, fans of a particular celebrity, for example, may occasionally wish to acquire images of a celebrity so as to maintain awareness of whereabouts of the particular famous person. However, prior to determining presence of a celebrity's face in a digital image, a digital image may first be processed to determine localized regions within which one or more human faces may be depicted. Specialized facial recognition processing may be employed to provide one or more signal sample output values that correspond to the celebrity's identity for use by a search engine web crawler, for example. Thus, responsive to receipt of a celebrity's name, a search engine may provide signal sample output values corresponding to one or more universal resource indicators (URI's), for example, to identify locations at which images of a particular celebrity may be depicted on the Internet. It should be noted, that this is but one simplified example use case for purposes of illustration, and claimed subject matter is not limited in this respect.

In one or more embodiments, terms such as "detection" of one or more depictions of a human face in an image, in which a human face may be oriented at one of a number of possible "aspects" in one or more localized regions of an image, may be expressed utilizing a "heat map." In this context, a "detection percentage," such as facial detection percentage, refers to a ratio of instances for which a detector indicates presence of a human face depicted in one or more images with respect to a number of human faces actually present in the one or more images. In one possible embodiment, just to illustrate, if a total of 10 images of human faces are distributed among a set of three images, detection of a total of nine images in the three-image set would indicate a detection percentage of 90%, for example. Accordingly, a detection percentage may be degraded responsive to a detector failing to identify that a face is present (when a face is indeed present in an image). Also in this context, an "aspect" refers to a direction or angle that a human face may be tilted or slanted towards in an image. Thus, in an image, a human face oriented or tilted in a leftward direction, such as at an approximately 20.0 degree aspect angle, for example, may expose or permit emphasis of certain features of a human face and may occlude other features. In another example, a human face oriented or tilted in a downward direction, such as at an approximately 15.0 degree aspect angle, may permit emphasis of certain features and occlude other features. An aspect may also refer to a human face that is partially occluded (such as in a cropped image), a human face that is partially occluded by eyeglasses, sunglasses, goggles, or other eyewear, for example, a human face that is rotated (such as rotated 90.0 degrees in plane, for example) and claimed subject matter is not limited in this respect.

Additionally in this context, a "heat map" refers to an approach toward measuring likelihood that a human face, or some portion thereof, for example, is present at a particular region or sub-region of an image. In embodiments, a "heat map" may refer to locations in an image map comprising measured signal value levels approximately in the range 0.0 to 1.0. Thus, in particular embodiments, lower-valued heat map signal levels may indicate localized regions of an image at which a human face may be unlikely to be depicted. In embodiments, higher-valued heat map signal levels may indicate localized regions of an image where a human face may be likely to be depicted. Of course, claimed subject matter is intended to embrace other modes of expressing localized regions of an image where one or more human faces may be likely to be depicted.

Embodiments may utilize, for example, real number-valued signal levels utilizing differing scales, such as signal value levels approximately in the range of −50.0 to +50.0, in which positively-valued signal levels indicate greater than 50% probability that a depiction of a human face exists in a particular localized region. Likewise, negatively-valued signal levels may indicate less than a 50% probability that a human face may be depicted at a particular localized region of a digital image. In other embodiments, alphabetically-lettered values may be utilized, such as, for example, wherein the letter "A" may be utilized to indicate greater than a 90% probability that a human face may be depicted at a particular localized region, and wherein "G" indicates less than a 20% probability that a human face may be depicted at a particular localized region. In other embodiments, localized regions of images may be color-coded to indicate likelihood that a human face may be depicted at a particular localized region of a digital image. For example, localized regions likely to comprise one or more depictions of human faces may be identified using a reddish hue. Localized regions unlikely to comprise one or more depictions of human faces may be identified utilizing a bluish color. However, again, claimed subject matter is intended to not be limited to any particular manner of expressing likelihood of a presence of one or more depictions of human faces at localized regions of images, including those provided as illustrations.

Thus, the foregoing are merely examples to illustrate particular embodiments in which detection of one or more multi-aspect facial images in a localized region of a digital image may involve training a neural network utilizing a classifier, such as a machine learning classifier (which may comprise, for example, a support vector machine (SVM)), for example, which may be complex and/or time intensive.

For example, gathering and/or storage of large number of measurements of digital content would typically be employed. So-called "ground truth" may also employed, meaning verification using a sample set where it is believed, with reasonably high confidence, that one or more depictions of human faces exists in a known localized region of an image.

A neural network may, in an embodiment, be implemented using one or more sets of instructions capable of being executed by one or more computing devices, for example. A computing device may operate using physical signals and/or physical states, such as physical states corresponding to non-transitory physical memory states, for example. It is noted that the term "signal sample values" and/or similar terms throughout this patent application are understood to refer to physical signals and/or physical states, such as physical states corresponding to non-transitory physical memory states. A neural network may comprise, for example, one or more input signal layers, which may refer to one or more network layers to receive and/or access input signal samples. A neural network may additionally comprise one or more output signal layers, which may refer to a network layer that generates observable output signal samples, such as in the form of an output parameter file, which may include output signal sample values that have been processed and may be accessible by one or more sets of computer-executable instructions, such as operating external to the neural network, for example. A neural network may further comprise one or more "hidden" layers, which may refer to one or more layers of a neural network to perform signal processing. It is noted that a distributed computing system, in some cases, may be employed, but is generally not necessarily required.

In certain embodiments, a neural network, which may comprise, for example, a network of "neurons," may be employed to generate signal sample values to indicate localized regions of a digital image at which one or more human faces, which may be oriented at one of a number of aspects, may be depicted. A neural network may comprise, for example, hundreds, thousands, millions, or a greater number of neurons, which may produce and/or generate one or more output signal samples as a function of one or more input signal samples, for example. Thus, a neuron of a neural network, in an embodiment, may generate an output signal sample, such as f(x), responsive to one or more input signal samples, such as $f(z_1)$, $f(z_2)$, $f(z_3)$, and so forth. In particular embodiments, neurons of a neural network may generate, for example, an output signal sample responsive to executing a weighted superposition (e.g., summing) operation utilizing input signal samples $f(z_1)$, $f(z_2)$, and $f(z_3)$, such as shown in expression 1 below:

$$f(x)=w_1 f(z_1)+w_2 f(z_2)+w_3 f(z_3) \quad (1)$$

In expression 1, weights $w_1$, $w_2$, and $w_3$, may comprise, for example, a value level approximately in the range of 0.0 to approximately 1.0.

Thus, in an embodiment, as will be described with reference to FIG. 1, parameters of a single neural network model for performing face detection may be developed. Model parameters of a neural network used for face detection may, at least in some embodiments, be leveraged from training a neural network to detect "everyday" objects in digital images. In this context, an everyday object refers to an object in ordinary, everyday usage, which may be recognized by a wide variety of individuals. Accordingly, an everyday object may include articles of clothing (e.g., a dress, a shoe, a belt, a purses etc.), furniture items (e.g., a table, a chair, a desk, etc.), articles of fruit (e.g., an apple, a banana, a cherry etc.), and/or a wide variety of other objects in contemporary common usage. A candidate approach to generating everyday object labels from input signal samples that employs a neural network is described by Krizhevsky et al., "ImageNet Classification with Deep Convolutional Neural Networks." Advances in Neural Information Processing Systems 25 (NIPS 2012).

In particular embodiments, thousands, hundreds of thousands, millions, or a greater number of samples of images may be utilized in training a neural network to label everyday objects. A neural network trained to detect everyday objects in digital images, may comprise five convolutional filtering layers and three fully-connected layers, which may involve approximately 650,000 neurons. A neural network of this type may utilize approximately 60,000,000 parameters at least some of which may be trained or developed utilizing one or more approaches, such as via a multinomial logistic regression, which may implement back propagation by way of stochastic gradient descent, for example. However, claimed subject matter is not limited to just such an approach provided as an illustration, of course.

In certain embodiments, convolutional filtering layers of a neural network may be utilized to process input signal samples, which may comprise a digital image or a contiguous portion of a digital image, for convolution with one or more kernel operations. In particular embodiments, convolutional filtering may be executed using sub-regions of a contiguous portion of a captured digital image, for example. In particular embodiments, a neural network may comprise, for example, at least five successive convolutional filtering layers, which, as described in greater detail below, may operate utilizing signal samples from previous convolutional filtering layers. Of course, it is understood that any neural network may be employed and claimed subject matter is not limited in scope to particulars of the illustrative examples provided, as previously indicated.

In certain embodiments, signal samples may undergo various stages of signal processing, such as in connection with processing by a neural network, including, for example, nonlinear filtering and/or "max-pooling," which may, in an embodiment, take place prior to signal samples being processed by a convolutional filtering layer, after signal samples are generated by a convolutional filtering layer, and/or during signal processing by a convolutional filtering layer, for example. In this context, max-pooling refers to a type of nonlinear down-sampling in which signal samples corresponding to a portion of an image may be pooled into, for example, a signal sample value level, such as a single, maximum signal sample value level for the image portion. In particular embodiments, filtered and max-pooled signal samples, after being generated by a layer, may be utilized by one or more additional convolutional filtering layers of a neural network, such as previously described, for example. In an embodiment, nonlinear filtering of signal samples from a convolutional filtering layer may involve use of rectification. In general, rectification and/or similar terms, in this context, may be understood to refer to permitting a signal in one direction but not an opposing direction. In this context, therefore, negative signals are cut off or truncated while positive signals are permitted or passed through. For a signal sample x, for example, rectification may be described as being substantially in accordance with max(0,x). However, in other embodiments, filtering of signal samples may involve filtering using other linear and/or nonlinear approaches, which may operate in place of or in addition to rectification. Thus, claimed subject matter is not limited in scope in this respect.

In some embodiments, successive convolutional filtering layers may execute image processing of signal sample values which may, for example, correspond to a contiguous portion of a captured image. Signal samples generated at one convolutional filtering layer may comprise signal samples for use by another filtering layer, such as of a neural network. Thus, in this context, the term "fully-connected" filtering layers of a neural network and/or similar terms refer to substantially all neurons of a previous layer coupling to all neurons of a subsequent layer. However, it should be noted that this is but one way of arranging neurons, and claimed subject matter is not limited in this respect. In particular embodiments, such an arrangement may permit processing of substantially all signal sample outputs from a previous fully-connected layer by one or more subsequent fully-connected layers, for example.

Embodiments of claimed subject matter may be distinguished from conventional approaches utilized to detect human faces in digital images. For example, conventional techniques may involve a number of different training models, which may be utilized to respectively correspond to a particular aspect at which a human face may be depicted in a digital image. For example, to detect an image of a human face oriented 30.0 degrees off-axis utilizing conventional measures, a corresponding training model, which may be useful primarily for a specific range of off-axis orientations, such as between approximately 25.0 degrees and 35.0 degrees, may be utilized. In another example of a conventional technique, to detect a partially-cropped image of a human face or to detect an image of a partially-occluded human face in a digital image, two or more specific training models may be utilized. Thus, in addition to substantial time and/or cost, conventional face detection techniques may involve use of considerable computational and/or memory resources. It is contemplated that conventional training approaches for detection of multi-aspect images of human faces may utilize numerous distinct training models, which may include training models to detect images of human faces rotated in-plane, training models to detect cropped and/or occluded images of human faces, training models to detect human faces oriented off-axis, and so forth. Of course, this would typically result in significant complexity.

In an embodiment, as an illustration, at a high level, a neural network may be developed for digital content using a large number of images and/or portions thereof, for example, to perform image classification of everyday objects. After ascertaining parameters of a neural network trained to label everyday objects, which may be iteratively refined responsive to processing batches of captured digital images, for example, the neural network may be modified, such as, for example, by converting "fully-connected" layers to "convolutional filtering" layers and refining the neural network to provide output signal sample values corresponding to a probability that a human face, which may be oriented at one of a number of possible aspects, is depicted at one or more localized regions of digital images. Refining a neural network trained to perform everyday object recommendation may involve use of a relatively small number of digital images, such as approximately 15,000 to 30,000 images, for example, if compared with potentially millions of images utilized in training a neural network to classify everyday objects. In an embodiment of claimed subject matter, in contrast, using a relatively small sample of digital images (at least in comparison with a sample used to generate parameters for a neural network trained to label everyday objects), a neural network may be trained and then employed to generate neural network output signal sample values corresponding to probabilities that a human face is depicted in a particular localized region of a digital image. Likewise, the trained neural network would be capable of providing acceptable results.

FIG. 1 is a schematic diagram of a neural network, which may operate according to an embodiment 100. Although two distinct neural networks are identified in FIG. 1, such identification is for the convenience of explanation. In implementations, typically one neural network, which may be utilized and then later modified as described herein, may be employed. Nonetheless, continuing with this illustrative example, in at least some embodiments, a first group of digital images, comprising digital images 105A, 105B, . . . , 105N, may correspond to everyday objects, which may differ from a second digital image group, comprising digital images 150A, 150B, . . . , 150N. These latter images may correspond to multi-aspect facial images at various localized regions of digital images.

In the embodiment of FIG. 1, a first group of digital images (e.g., 105A, 105B, . . . , 105N) may be used to train a neural network to generate signal sample values corresponding to one or more everyday object labels for a digital image, previously discussed herein. Thus, neural network parameters, such as described below, may subsequently be refined for use by a neural network to generate signal sample values corresponding to probabilities that one or more human faces is depicted at localized regions of a digital image, for example. As mentioned, some modifications may be made, if appropriate, to the developed neural network processing, since, in general, image classification is not the same as generating detection probabilities for localized regions of an image.

It should also be noted that in particular embodiments, signal sample values corresponding to probabilities that a human face is depicted at a localized region of a digital image may be expressed in terms of heat maps, such as heat maps previously discussed. Thus, refining of neural network parameters may permit generation of such maps, in an embodiment. In a heat map, localized regions where a human face is likely to be depicted may be annotated by darker-colored areas. Localized regions where a human face is unlikely to be depicted may be annotated by lighter-colored areas. In embodiments, parameters of a neural network may be refined by utilizing a group of digital images comprising multi-aspect facial images. In this context, multi-aspect facial images refers to facial images modified by in-plane rotation (e.g., clockwise, counterclockwise, and so forth), partially occluded facial images, facial images oriented off-axis, and/or partially cropped facial images, or any combination thereof.

Returning to FIG. 1, in certain embodiments, a neural network trained to perform object classification may employ convolutional filtering layers, such as convolutional filtering layers 110, 112, 114, 116, and 118, for example. A neural network trained to perform object classification may additionally employ fully-connected layers, such as fully-connected layers 120, 122, and 124, for example. In particular embodiments, a convolutional neural network (CNN), such as shown in FIG. 1, may be described as a "deep" CNN. A deep convolutional neural network refers to a neural network in which signal samples from one or more convolutional filtering layers, such as convolutional filtering layer 110, are used to provide signal samples to one or more other convolutional filtering layers, such as layer 112, for example, and/or one or more fully-connected layers, such as fully-connected layers 120, 122, and 124. In the embodiment of FIG. 1, substantially square localized regions of a digital image may be processed, which may encompass areas of approximately 224 pixels by approximately 224 pixels, for example, although claimed subject matter is intended to embrace localized regions of virtually any number of pixels arranged in any number of shapes. In particular embodiments, convolutional filtering layer 110, for example, may convolve one or more sub-regions with one or more image processing kernel operations, which may permit, for example, signal processing with respect to features of a sub-region. Convolutional filtering layers 112, 114, 116, or 118, for example, may convolve signal samples of a previous convolutional filtering layer with one or more image processing kernels.

In certain embodiments, signal samples of one or more convolutional filtering layers 110-118 may be filtered using rectification, which may beneficially assist in training. It should be noted that although use of rectification may in some situations be beneficial, other types of linear/nonlinear filtering may be utilized, and claimed subject matter is not limited in any particular image processing. Signal samples from one or more of convolutional filtering layers 110, 112, 114, 116, and 118 may additionally be pooled using, for example, a max-pooling approach, which refers to a type of nonlinear down-sampling of signal samples corresponding to a portion of an image pooled into, for example, another signal sample value level, such as a single, maximum signal sample value level for the image portion, for example. In particular embodiments, filtered and max-pooled signal samples, after being generated by a layer, may be utilized by one or more additional convolutional filtering layers, such as previously described, for example.

In FIG. 1, images 105A, . . . , 105N may comprise any number of contiguous images, such as an image of a zebra (105A), bananas (105B), and a semi-truck (105N), as merely examples. In an embodiment, images 105A, . . . , 105N may comprise a training set of more than 1,000,000 images, which may be used, for example, to develop a neural network of 60,000,000 parameters of a 650,000-neuron neural network. (See, for example, Krizhevsky et al., discussed previously, supra.) In one non-limiting embodiment, just to illustrate, convolutional filtering layers 110, 112, 114, 116, and 118 may comprise 253,440 neurons, 186,624 neurons, 64,896 neurons, 64,896 neurons, and 43,264 neurons, respectively, although claimed subject matter is not limited to this illustrative example. Thus, more or fewer neurons, for example, may be employed in a neural network. In an embodiment, such as shown in FIG. 1, for example, subsequent to convolving operations executed by convolutional filtering layers, signal samples from, for example, convolutional filtering layer 218 may be used as signal samples to be processed by fully-connected layers 120, 122, and 124. In one non-limiting embodiment, just to illustrate, fully-connected layers 120, 122, and 124 may comprise 4096 neurons, 4096 neurons, and 1000 neurons, respectively, although, again, claimed subject matter is not limited to this illustrative example. In the particular embodiment of FIG. 1, object labels may comprise, for example, object label 130, which may correspond to the zebra of digital image 105A, object label 132, which may correspond to the bananas of digital image 105B, and/or object label 134, which may correspond to the semi-truck of digital image 105N. Thus, initially a neural network may be trained, such as via a multinomial logistic regression objective, as an example approach, which may implement back propagation by way of stochastic gradient descent, for example. Of course, other approaches may likewise be implemented such as simulated annealing, which may be utilized in obtaining a global minimum of a function being processed, for example, nonlinear conjugate gradient Marquardt process, and Broyden-Fletcher-Goldfarb-Shanno (BFGS) process, and others, for example.

In an embodiment, however, as shown in FIG. 1, at least some parameters of a CNN comprising convolutional filtering layers 110-118 and fully-connected layers 120-124 may be refined to provide signal sample values corresponding to the detection probability given the possibility that one or more human faces is depicted at localized regions of digital images, such as digital image 160. In an embodiment, digital images 150A, 150B, . . . , 150N comprise a set of digital images, which may number into the thousands, millions, and so forth. However, in at least some embodiments, digital images 150A, 150B, . . . , 150N may also comprise a much smaller-sized group of digital images, such as a number of digital images approximately in the range of 15,000 to 30,000, for example. In the embodiment of FIG. 1, parameters developed (e.g., via training) for use by convolutional filtering layers 110, 112, 114, 116, and 118 to execute image object labeling may, at least in some embodiments, be refined for use in a neural network to generate detection probabilities that one or more images of human faces is depicted at localized regions of digital images.

As shown in FIG. 1, digital images 150A, 150B, . . . , 150N exhibit multi-aspect images of one or more human faces, such as those oriented in an off-axis direction (150A), partially occluded (150B), and rotated in-plane (150N), as an example. It should be noted that, as previously described, embodiments may involve a wide variety of additional examples of multi-aspect images of human faces is possible. In addition to those previously mentioned, examples of multi-aspect images include digital images in which as many as 10 or more images of human faces may be depicted, digital images in which one or more human faces is directed partially or almost completely to the left or to the right, digital images in which one or more human faces is shown wearing glasses, in-plane rotations of human faces of approximately −180.0 degrees to approximately +180.0 degrees, images in which a substantial portion of a human face is least partially occluded from view. In an embodiment, digital images 150A, 150B, . . . , 150N may be gathered from a database of digital images comprising one or more images of human faces such as described in "Annotated Facial Landmarks in the Wild [AFLW]: A Large-Scale, Real-World Database for Facial Landmark Localization," M. Koestinger, P. Wohlhart, P. Roth, and H. Bischof, Institute for Computer Graphics and Vision, Graz University of Technology, December/2011 (the "AFLW database"). The AFLW database comprises, for example, approximately 21,000 images having a total of approximately 24,000 annotated images of human faces spread across the approximately 21,000 images. However, claimed subject matter is not limited to any particular number of facial images or any particular number of annotations of human faces for training.

In the embodiment of FIG. 1, digital images 150A, 150B, . . . , 150N, for example, comprise a set of digital images, which may be utilized to refine CNN parameters developed to detect everyday objects with a CNN. In one or more embodiments, for example, refinement of CNN parameters may be achieved, at least in part, using a softmax loss function, (e.g., objective $\mathcal{R}$) which may be expressed as:

$$\mathcal{R} = \Sigma_{x_i \in \mathcal{B}} \log [\text{prob}(z_i | x_i)] \quad (1)$$

$\mathcal{R}$ comprises a loss or error function. Typically, of course, reducing loss or error is an objective. $\mathcal{B}$ comprises an example batch used here to refine parameters by iteratively employing stochastic gradient descent. Here, $z_i$ comprises a label of example $x_i$. Refinement of expression 1 may be repeated (iterated) until a desired facial detection percentage, such as approximately 90.0%, approximately 95.0%, approximately 99.0%, and so forth, is achieved.

Thus, in one instance, if a batch ($\mathcal{B}$) does not comprise input image sample values comprising a threshold percentage of human faces, it may not be possible to refine parameters of the CNN. Accordingly, a batch ($\mathcal{B}$) may be modified to include a threshold percentage of positive facial samples, such as at least 25.0% of training samples, for example, may include one or more depictions of a human face at one or more localized regions of a digital image. A threshold percentage of positive facial samples, comprising one or more images of a human face at one or more localized regions of a digital image may, therefore, be beneficial in bringing about convergence of refined parameters of a CNN trained for image object classification. It should be noted, however, that use of such a threshold percentage of positive facial samples (e.g., approximately 25.0%) represents one of many possible embodiments, and claimed subject matter is not limited in this respect. For example, in other embodiments, a set of digital images comprising a different threshold percentage of human faces depicted at one or more localized regions of a digital image, such as approximately 20.0%, approximately 30.0%, approximately 50.0%, and so forth, may be utilized, and claimed subject matter is not limited in this respect.

In an embodiment, as mentioned, fully-connected layers 120, 122, and 124, may undergo certain adjustments prior to being utilized in a neural network to generate signal sample values corresponding to detection probabilities that an image of a human face is depicted at a localized region of a digital image. For example, in a particular embodiment, it may be beneficial to convert fully-connected layers 120, 122, and 124 to convolutional filtering layers, such as convolutional filtering layers 220, 222, and 224 of FIG. 1. In embodiments, conversion of fully-connected layers to convolutional filtering layers may comprise reshaping parameters of fully-connected layers, such as substantially in accordance with the description by R. B. Girshick, F. N Iandola, T. Darrell, and J. Malik, "Deformable Part Models are Convolutional Neural Networks," Computing Research Repository, October 2014, for example.

In the embodiment of FIG. 1, responsive to refining of CNN parameters, via processing of digital images 150A, 150B, ..., 150N, for example, using expression 1, the CNN comprising filtering layers 110-224 may access digital image 160. Digital image 160, which depicts four human faces at four localized regions of the image, may be processed by convolutional filtering layers 110-224 utilizing refined CNN parameters. Responsive to processing, convolutional filtering layers 110-224 may generate heat map 170. In an embodiment, heat map 170 may exhibit localized regions corresponding to regions of digital image 160 at which one or more human faces may be likely to be depicted.

Figure 2:
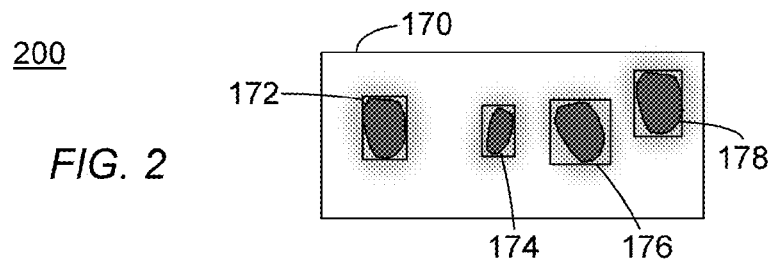
FIG. 2 is a heat map showing localized regions of a digital image within which an image of a human face, oriented at one of a number of possible aspects, may be likely to be depicted, according to an embodiment.

FIG. 2 is a heat map showing localized regions within which an image of a human face is likely to be depicted according to an embodiment 200. In FIG. 2, heat map 170 includes dark-colored regions 172, 174, 176, and 178, within which it may be likely that an image of a human face is depicted. Localized regions 172, 174, 176, and 178 appear at least partially surrounded by lighter-colored regions, which may indicate localized regions less likely to include a depiction of a human face. In embodiments, responsive to detection of localized regions within which an image of a human face may be likely to be depicted, specialized processing may be utilized to determine one or more identities. It should be noted that although dark-colored regions, such as regions 172, 174, 176, and 178, may be used to indicate localized regions wherein an image of a human face is likely to be depicted, other embodiments may utilize other approaches of identifying localized regions, e.g., in alternate embodiments. An embodiment may, for example, involve listing of X-Y coordinates corresponding to individual pixels of an image along with corresponding probabilities that an image of a human face, or portion thereof, is depicted at, or proximate to, an X-Y coordinate.

Figure 3:
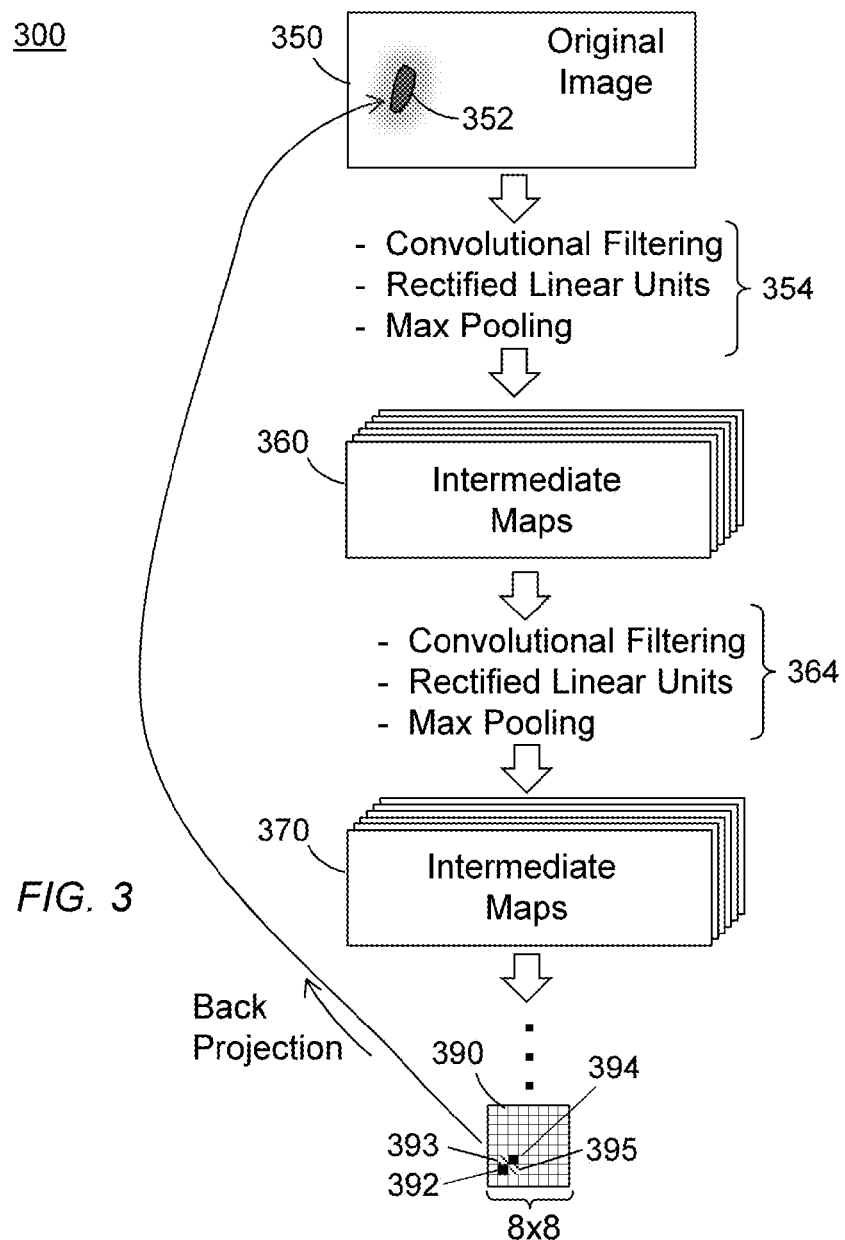
FIG. 3 is a schematic diagram showing back projection of a detected image of a human face from a convolutional filtering layer to an original (e.g., initial) image according to an embodiment.

FIG. 3 is a schematic diagram showing back projection of a detected image of a human face from a convolutional filtering layer to an original (e.g., initial) image according to an embodiment 300. In FIG. 3, original image 350 may depict a human face, such as identified at location 352, for example. In an embodiment, original image 350 may be processed such as at block 354, utilizing a convolutional filtering layer. Convolutional filtering may comprise, max pooling, for example, as well as use of rectified linear units, in which an input signal (e.g., f(x)) may be converted to an output signal according to an operation such as f(x)=Max (0,x). Intermediate maps 360 may be generated responsive to output signals processed by convolutional filtering layer 1, for example. Additional convolutional filtering, may give rise to additional use of rectified linear units, max pooling, and so forth, such as indicated at block 364, which may bring about intermediate maps 370, for example.

In embodiments, responsive to completion of successive convolutional filtering operations, max-pooling, and/or additional image processing operations, such as rectification, two-dimensional map 390 may be generated. In embodiments, two-dimensional map 390 may comprise a single map to indicate localized regions, such as regions 392 and 394, which may correspond to localized regions in original image 350 at which images of one or more human faces are likely (e.g., beyond a threshold percentage of likelihood) to be depicted. In the embodiment of FIG. 3, responsive to a determination that regions 392 and 394 are likely to indicate depiction of one or more images of a human face, these regions may be back projected to location 352 of original image 350 utilizing, for example, a heat map. In one possible embodiment, just to illustrate, a grid location of two-dimensional map 390, for example, may indicate a probability that a human face, or at least some portion of a human face, is depicted at a corresponding location of original image 350. Thus, in FIG. 3, regions 392 and 394 may indicate that a human face is likely depicted at location 352 of original image 350. In the embodiment of FIG. 3, regions adjacent to regions 392 and 394, such as 393 and/or 395 may indicate a lesser probability (e.g., a probability lower than a threshold percentage of likelihood) that a human face is depicted at a corresponding location of original image 350. However, claimed subject matter is not limited to any particular manner in which a likelihood that a human face is depicted, for example, may be back projected to an original image.

Figure 4:
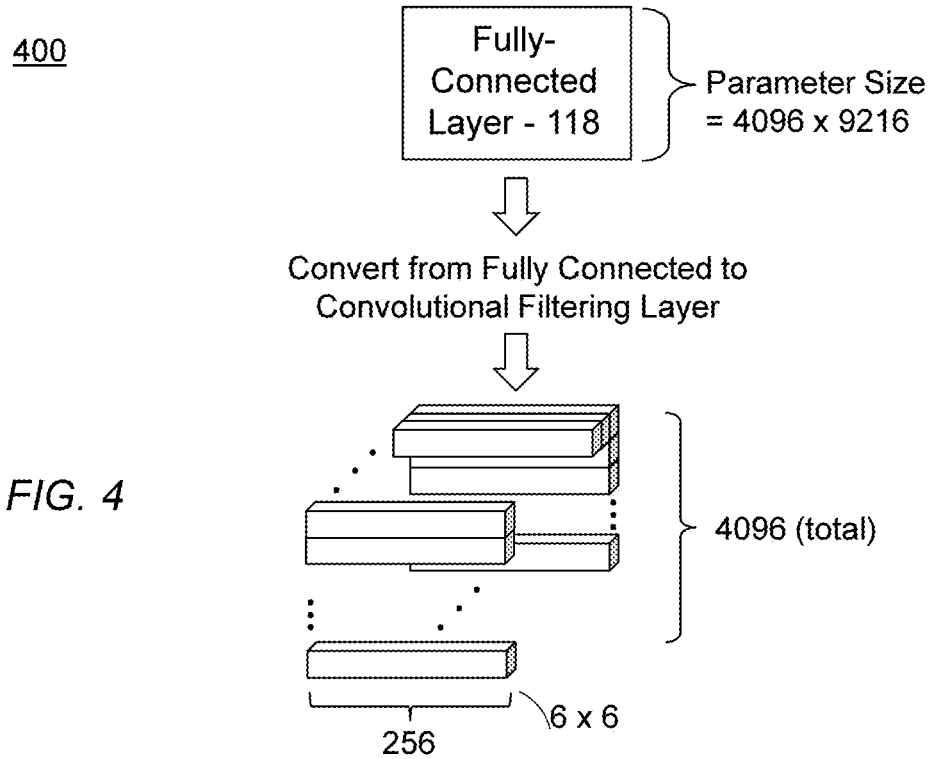
FIG. 4 is a schematic diagram showing conversion of a fully-connected layer to a convolutional filtering layer, such as described with reference to FIG. 1, according to an embodiment.

FIG. 4 is a schematic diagram showing conversion of a fully-connected layer to a convolutional filtering layer, such as described with reference to FIG. 1, according to an embodiment 400. As shown in FIG. 4, fully-connected layer 120 may accommodate a parameter size of 4096×9216, for example. Accordingly, in certain implementations, improved computational efficiency may be realized by converting fully-connected layers to convolutional filtering layers so that matrix operations (e.g., matrix multiplication) may be used to obtain, for example, a single two-dimensional map, such as two-dimensional map 390 of FIG. 3. In embodiments, conversion of a fully-connected layer to a convolutional filtering layer may be brought about by reshaping a constituent matrix of a fully-connected layer, such as from a two-dimensional matrix comprising 4096 columns×9216 rows, to a four-dimensional matrix comprising 4096 pages, wherein one or more pages comprises a three-dimensional matrix comprising dimensions of 6×6×256, for example. Accordingly, as shown in FIG. 4, a fully-connected layer may retain an original number of columns (e.g., 4096) in which rows are rearranged from single vectors comprising 9216 elements to three-dimensional matrices comprising dimensions of 6×6×256. However, claimed subject matter is not limited in this respect, as alternative rearrangements of fully-connected layers are possible.

Thus, responsive to modifying a shape of a two-dimensional matrix to form a three-dimensional matrix, which may give rise to conversion of a fully-connected layer to a convolutional filtering layer, input image signal processing time may be reduced. In embodiments, a reduction in input image signal processing time may be induced by an ability to perform image processing operations in parallel, such as by way of concurrent processing of separate portions of input image signals by a corresponding number of pages of a four-dimensional matrix (e.g., by utilizing one matrix page per portion of an image).

Figure 5:
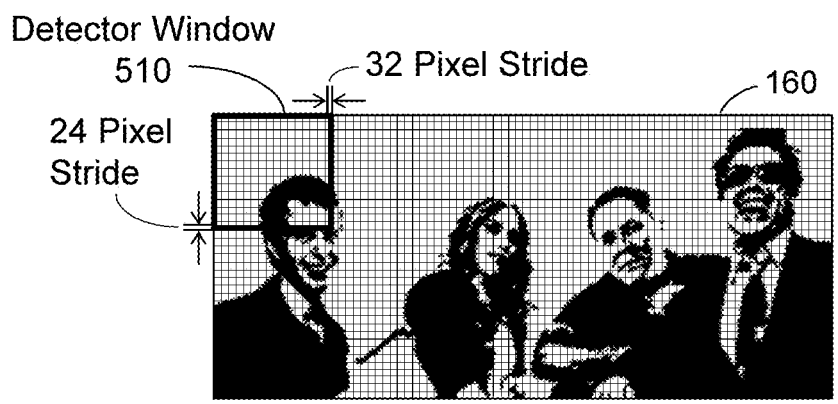
FIG. 5 is a schematic diagram showing use of a detector window and stride, according to an embodiment.

FIG. 5 is a schematic diagram showing use of a detector window and stride according to an embodiment 500. In FIG. 5, detector window 510, shown as encompassing an upper left portion of image 160, may be moved across the width of input image 160. In embodiments, detector window 510 may encompass an area of 227×227 pixels and comprise a 32-pixel stride, in which the 32-pixel stride may correspond to the number of pixels between successive image frames. Accordingly, in one or more non-limiting embodiments, detector window 510 may be capable of processing images, or portions thereof, having an area of 195 pixels by 195 pixels (wherein the quantity 195 represents 32 pixels subtracted from 227 pixels.) In certain embodiments, a stride utilized for scanning in a horizontal direction may differ from a stride utilized for scanning in a vertical direction, for example. Thus, in one possible embodiment, a 32-pixel stride may be utilized for scanning of detector window 510 in a horizontal dimension, and a different stride, such as 24-pixels, in one possible non-limiting example, may be utilized for scanning in a vertical dimension. Accordingly, strides utilized for horizontal and vertical scanning of images may comprise approximately identical numbers of pixels (e.g., 32 pixels) or may comprise differing numbers of pixels, and claimed subject matter is not limited in this respect.

Figure 6:
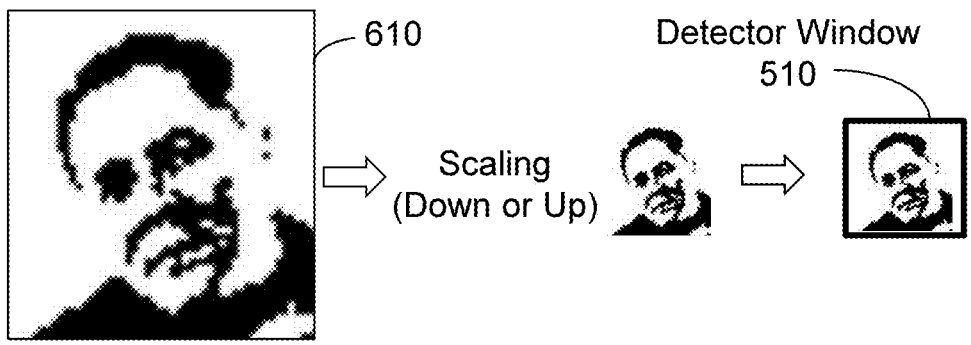
FIG. 6 is a diagram showing scaling of signal samples corresponding to an input image, or portion thereof, for use with a particularly-sized detector window, according to an embodiment.

FIG. 6 is a diagram showing scaling of signal samples corresponding to an input image, or portion thereof, for use with a particularly-sized detector window according to an embodiment 600. As mentioned previously with respect to FIG. 5, herein, detector window 510 may comprise an area of approximately 195 pixels×195 pixels, for example. Thus, input image samples corresponding to larger images may be scaled down so as to permit an image, or portion thereof, to be accommodated by detector window 510. In other instances, in which input image samples may correspond to smaller images, input images, or portions thereof, may be scaled up so as to permit smaller images to be accommodated by detector window 510. In addition to scaling, signal samples corresponding to input images may undergo additional image processing, and claimed subject matter is not limited in this respect.

In one possible, non-limiting example, facial images, such as facial image 610, may comprise an area as small as approximately 45 pixels×45 pixels. Facial images 610 may be detected by upscaling an image by a factor of approximately 5.0 to bring about an image size of approximately 225 pixels×225 pixels. Larger images may be down scaled, perhaps repetitively, for example, until an image dimension comprises less than 227 pixels. In one particular, non-limiting, embodiment, a scaling factor, $fs \in \{0.5^{1/1}, 0.5^{1/2}, 0.5^{1/3}, 0.5^{1/5}, 0.5^{1/7}\}$ may be utilized. However, in embodiments, decreasing f may permit a detector window, such as detector window 510, to scan input image signal sample values in relatively fine detail, which may therefore increase computational time. On the other hand, increasing $f_s$ may give rise to coarser scanning of input image signal sample values, which may decrease computational time. Accordingly, a mid-range value, such as $fs=0.5^{1/3}$ may represent a scale factor that permits sufficiently fine scanning by a detector window, such as detector window 510, without unduly increasing computational time. It should be noted, however, that example values of fs, such as, $0.5^{1/1}$, $0.5^{1/2}$, $0.5^{1/3}$, $0.5^{1/5}$, $0.5^{1/7}$, are intended only for purposes of illustration, and claimed subject matter is not limited in this respect.

Figure 7:
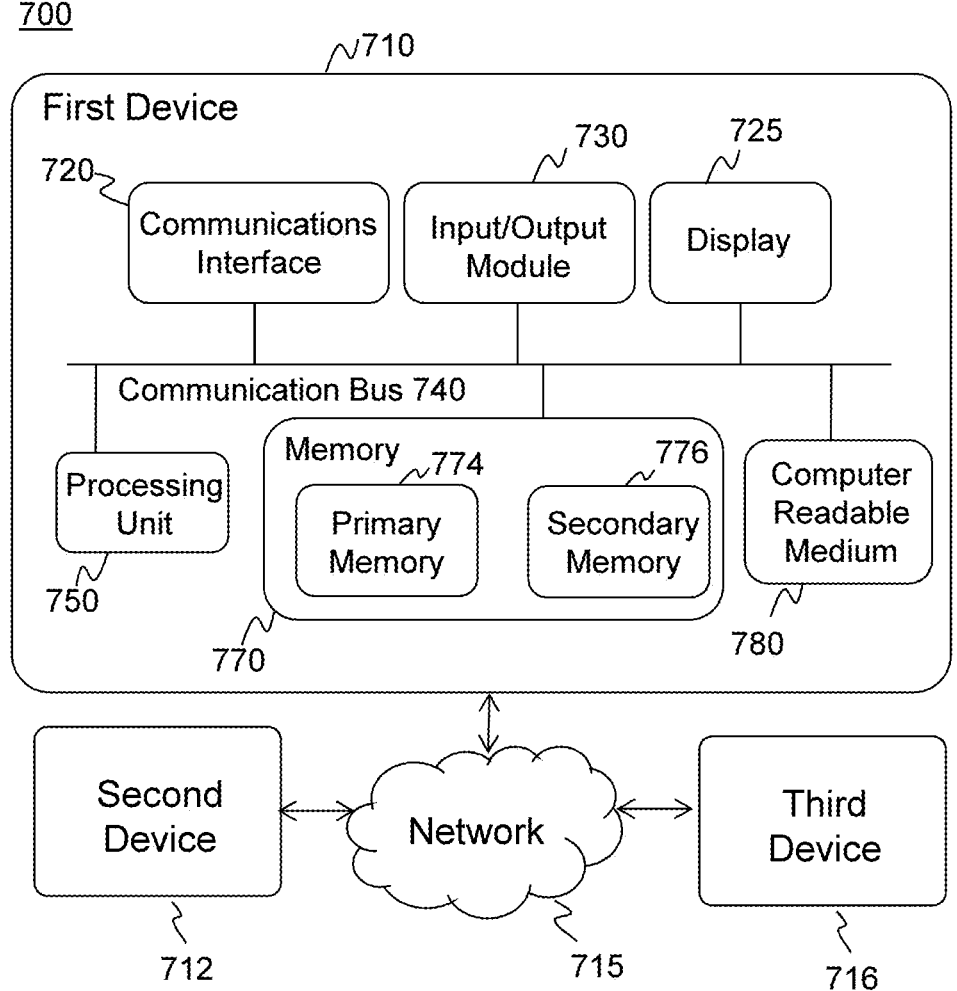
FIG. 7 is a schematic diagram of a system that may be employed in a client-server type interaction, according to an embodiment.

FIG. 7 is a schematic diagram of a system that may be employed in a client-server type interaction, according to an embodiment 700. In FIG. 7, computing device 710 ('first device' in figure) may interface with client 712 ('second device' in figure), which may comprise features of a client computing device, for example. Communications interface 720, processor (e.g., processing unit) 750, and memory 770, which may comprise primary memory 774 and secondary memory 776, may communicate by way of communication bus 740, for example. In FIG. 7, client computing device 712 may represent one or more sources of analog, uncompressed digital, lossless compressed digital, and/or lossy compressed digital formats for content of various types, such as video, imaging, text, audio, etc. in the form physical states and/or signals, for example. Client computing device 712 may communicate with computing device 710 by way of a connection, such as an internet connection, via network 715, for example. Although computing device 710 of FIG. 7 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter to limited in scope to illustrative examples.

Processor 750 may be representative of one or more circuits, such as digital circuits, to execute at least a portion of a computing procedure and/or process. By way of example, but not limitation, processor 750 may comprise one or more processors, such as controllers, microprocessors, microcontrollers, application specific integrated circuits, digital signal processors, programmable logic devices, field programmable gate arrays, the like, or any combination thereof. In implementations, processor 750 may execute signal processing to manipulate signals and/or states, to construct signals and/or states, etc., for example.

Memory 770 may be representative of any storage mechanism. Memory 770 may comprise, for example, primary memory 774 and secondary memory 776, additional memory circuits, mechanisms, or combinations thereof may be used. Memory FIG. 7 is a schematic diagram of a system that may be employed in a client-server type interaction, according to an embodiment. May comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 770 may be utilized to store a program. Memory 770 may also comprise a memory controller (not shown in FIG. 7) for accessing computer readable-medium 780 that may carry and/or make accessible content, which may include code, and/or instructions, for example, executable by processor 750 and/or some other unit, such as a controller and/or processor, capable of executing instructions, for example.

Under direction of processor 750, memory, such as memory cells storing physical states, representing, for example, a program, may be executed by processor 750 and generated signals may be transmitted via the Internet, for example. Processor 750 may also receive digitally-encoded signals from client computing device 712.

Network 715 may comprise one or more network communication links, processes, services, applications and/or resources to support exchanging communication signals between a client computing device, such as 712, and computing device 716 ('third device' in figure), which may, for example, comprise one or more servers (not shown). By way of example, but not limitation, network 715 may comprise wireless and/or wired communication links, telephone and/or telecommunications systems, Wi-Fi networks, WiMAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store content, such as measurements, text, images, video, audio, etc. in the form of signals and/or states. Thus, a computing device, in this context, may comprise hardware, software, firmware, or any combination thereof (other than software per se). Computing device 710, as depicted in FIG. 7, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD) players and/or recorders, game consoles, satellite television receivers, cellular telephones, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 770 may store cookies relating to one or more users and may also comprise a computer-readable medium that may carry and/or make accessible content, including code and/or instructions, for example, executable by processor 750 and/or some other unit, such as a controller and/or processor, capable of executing instructions, for example. A user may make use of input/output module 730, such as a computer mouse, stylus, track ball, keyboard, and/or any other similar device capable of receiving user actions and/or motions as input signals. Likewise, a user may make use of an output device, such as display 725, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be compliant and/or compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:
   training parameters of a convolutional neural network (CNN) to label everyday objects; and
   refining the parameters of the CNN, trained to label the everyday objects, to perform multi-aspect facial detection with respect to one or more images, the CNN being modified to exclude fully-connected layers.

2. The method of claim 1, wherein multi-aspect facial images comprise: off-axis facial images, partially occluded facial images, cropped facial images, tilted facial images, or any combination thereof.

3. The method of claim 1, further comprising training, prior to refining and modifying to exclude fully-connected layers, the CNN utilizing a set of training input image sample values depicting the everyday objects.

4. The method of claim 3, further comprising:
   modifying the set of training input image sample values to approach a threshold percentage of positive facial samples.

5. The method of claim 4, wherein a threshold percentage of positive facial samples approaches a value of approximately 20.0% to 50.0%.

6. The method of claim 1, further comprising:
   executing the refining until a facial detection percentage is achieved.

7. The method of claim 1, further comprising:
   scaling signal sample values corresponding to an input image to at least approximately correspond with a detector window size.

8. The method of claim 1, further comprising:
   back projecting one or more output signal sample values of a subsequent convolutional filtering layer of the CNN to an original image.

9. The method of claim 1, further comprising:
   displaying a heat map corresponding to one or more localized regions at which a depiction of one or more human faces is likely to be present in an input image.

10. The method of claim 1, wherein the CNN comprises an eight-layer deep CNN.

11. The method of claim 1, wherein the modifying of the CNN comprises excluding three fully-connected layers.

12. An apparatus, comprising:
    one or more processors to:
    train parameters of a convolutional neural network (CNN) to label everyday objects; and
    refine parameters of the CNN, trained to label the everyday objects, to perform multi-aspect facial detection with respect to one or more images, the CNN modified to exclude fully-connected layers.

13. The apparatus of claim 12, wherein multi-aspect facial images comprise off-axis facial images, partially occluded facial images, cropped facial images, tilted facial images, or any combination thereof.

14. The apparatus of claim 12, wherein the one or more processors are additionally to:
    train the CNN to classify input image signal samples depicting the everyday objects before the CNN is modified to exclude fully-connected layers.

15. The apparatus of claim 12, wherein the one or more processors are additionally to:
    scale signal sample values corresponding to an input image to at least approximately correspond with a detector window size.

16. The apparatus of claim 12, wherein the one or more processors are additionally to:
    back project one or more output signal samples of a subsequent convolutional filtering of the CNN to an original image.

17. An apparatus comprising:
    means for training parameters of a convolutional neural network (CNN) to label everyday objects; and
    means for refining the parameters of the CNN, trained to label the everyday objects, to perform multi-aspect facial detection, wherein the means for refining comprises means for modifying the CNN to exclude fully-connected layers.

18. The apparatus of claim 17, wherein the means for refining the CNN to perform multi-aspect facial detection comprises means for detecting off-axis facial images, partially occluded facial images, cropped facial images, tilted facial images, or any combination thereof.

19. The apparatus of claim 18, further comprising:
    means for scaling signal sample values corresponding to an input image to at least approximately correspond with a detector window size.

20. The apparatus of claim 18, further comprising:
    means for back projecting one or more output signal sample values of a subsequent convolutional filtering layer of the CNN to an original image.

* * * * *